United States Patent [19]

Zincone

[11] 3,999,888
[45] Dec. 28, 1976

[54] COMPOSITE TIP WEIGHT ATTACHMENT
[75] Inventor: Robert Zincone, Norwalk, Conn.
[73] Assignee: United Technologies Corporation, Hartford, Conn.
[22] Filed: June 25, 1975
[21] Appl. No.: 590,234
[52] U.S. Cl. ............................... 416/145; 416/230
[51] Int. Cl.² ................. B64C 11/26; B64C 27/54
[58] Field of Search ......... 416/144, 145, 230, 500, 416/80

[56] References Cited
UNITED STATES PATENTS

| 2,460,351 | 2/1949 | Hoffman et al. | 416/500 |
|---|---|---|---|
| 2,580,363 | 12/1951 | Schnitt | 416/144 |
| 2,941,603 | 6/1960 | Jovanovich | 416/144 |
| 3,103,977 | 9/1963 | Negroni | 416/230 |
| 3,169,412 | 2/1965 | Weeks | 416/500 |
| 3,484,174 | 12/1969 | McCoubrey | 416/226 |
| 3,813,186 | 5/1974 | Palacher et al. | 416/226 |

FOREIGN PATENTS OR APPLICATIONS

| 481,045 | 2/1952 | Canada | 416/144 |

Primary Examiner—Everette A. Powell, Jr.
Assistant Examiner—Thomas I. Ross
Attorney, Agent, or Firm—Maurice B. Tasker; Vernon F. Hauschild

[57] ABSTRACT

A helicopter rotor blade of composite material, characterized by the absence of a spanwise metal spar, has tip weight attachment means for supporting stacks of washer-like metal shim weights in the composite material of the blade adjacent its tip to obtain both dynamic chordwise and static spanwise balance of the blade. Three holes are bored in the composite material from the underside of the blade into which three tip weight assemblies are inserted and are adhesively or otherwise secured to the composite material. Each assembly includes a cylindrical liner, a central hollow stud and a nut which engages external threads on the stud for holding the weights in stacked configuration. A plate forming a closure for the hole completes the skin of the blade and a screw threaded into the end of the stud secures the plate in place.

15 Claims, 6 Drawing Figures

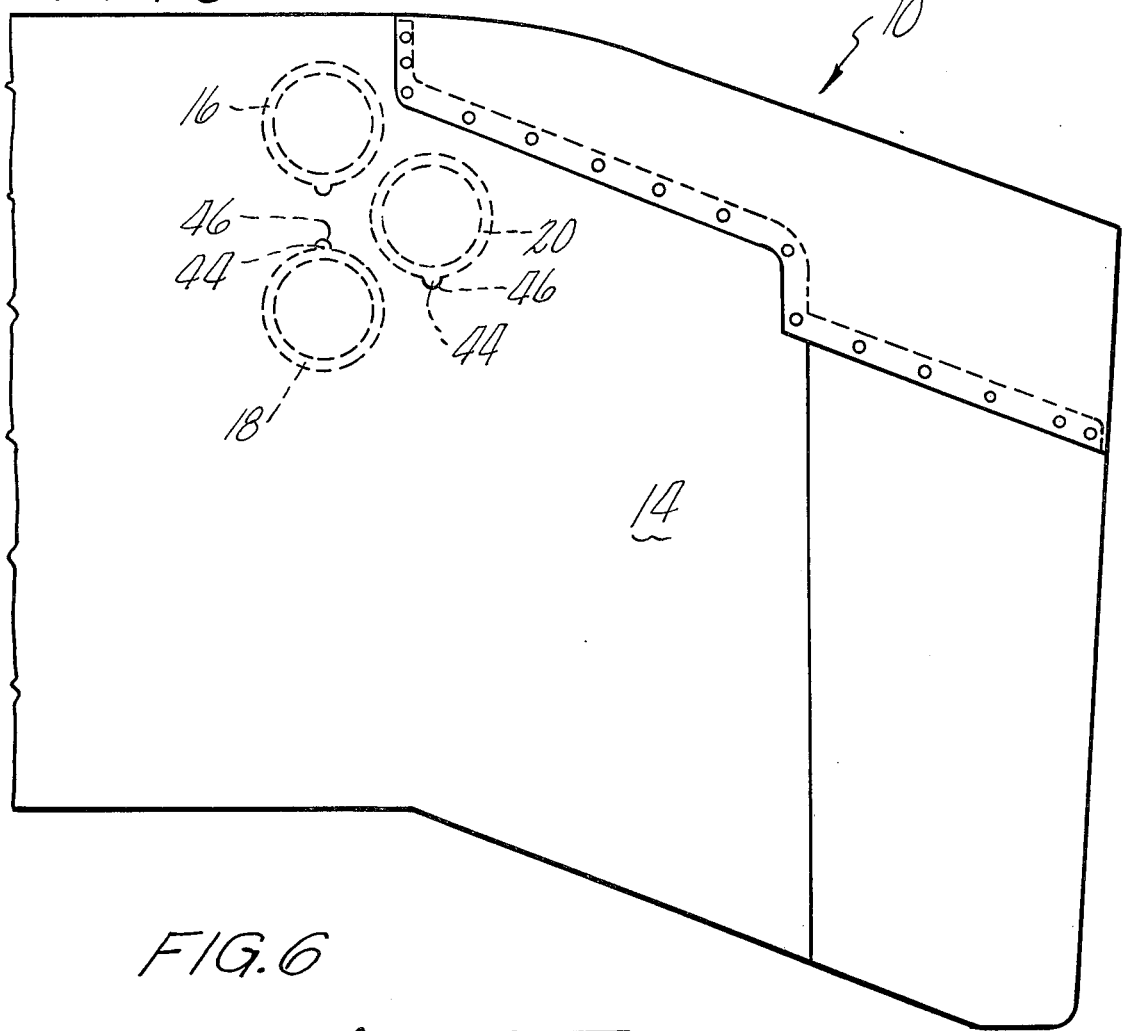
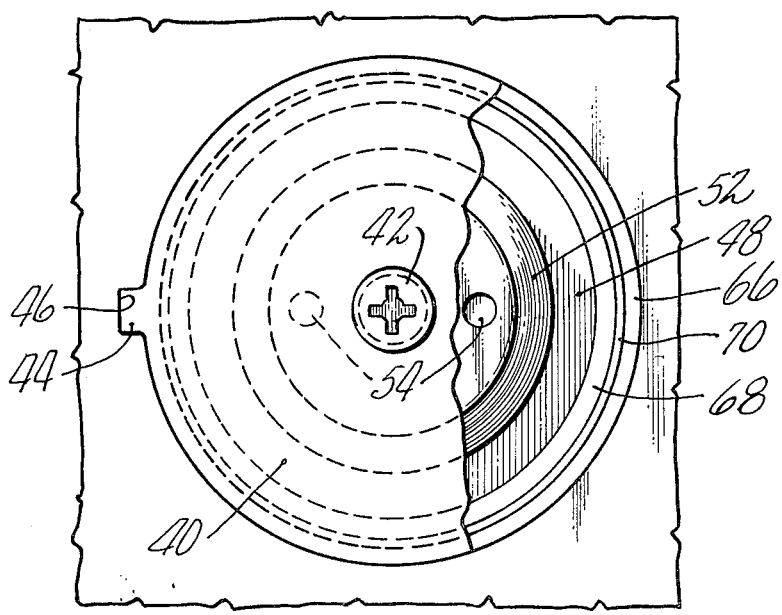

COMPOSITE TIP WEIGHT ATTACHMENT

The invention herein described was made in the course of or under a contract or subcontract thereunder, with the Department of the Navy.

BACKGROUND OF THE INVENTION

1. Field of the Invention

This invention relates to helicopter blades of the composite type which are characterized by the absence of a spanwise metal spar. More particularly the present invention relates to means for attaching tip weights to such a composite blade for the purpose of providing adjustable chordwise and spanwise balance of the blade.

2. Description of the Prior Art

Until recently helicopter blades have been made of metal and included a metal spar, often of airfoil contour, which extended throughout the length of the blade and frequently constituted the leading edge and main strength member of the blade, to which sheet metal box-like members were attached to complete the airfoil contour of the blade. Blade balance was obtained by bolting a metal tip block to the outboard end of the spar and attaching tip weights thereto. Access to the tip weights was provided by removing a tip cap attached along the chord by means of screws. A typical metal blade of this type is shown in U.S. Pat. No. 2,620,884, issued Dec. 9, 1952 to M. E. Gluhareff.

Bolted or screwed joints are not practical for an all-composite blade since their inefficiencies in this instance would require structural reinforcement resulting in undesirable weight penalty.

SUMMARY OF THE INVENTION

The primary object of this invention is to provide a composite rotor blade in which the tip weights are secured in the composite material without the use of direct bolted or screwed connections to the material.

A further object of this invention is to provide tip weight attaching means which are embedded in the composite material, which are secured in place therein without material weight penalty, and which are readily accessible for blade balancing purposes.

A yet further object of this invention is generally to improve the construction and performance of composite blades.

BRIEF DESCRIPTION OF THE DRAWINGS

FIG. 3 is a plan view of the tip portion of the blade showing the location of the tip weight assemblies;

FIG. 6 is an enlarged plan view of a tip weight assembly of FIG. 5 with a portion of the cover plate removed.

DESCRIPTION OF THE PREFERRED EMBODIMENTS

Figure 1:
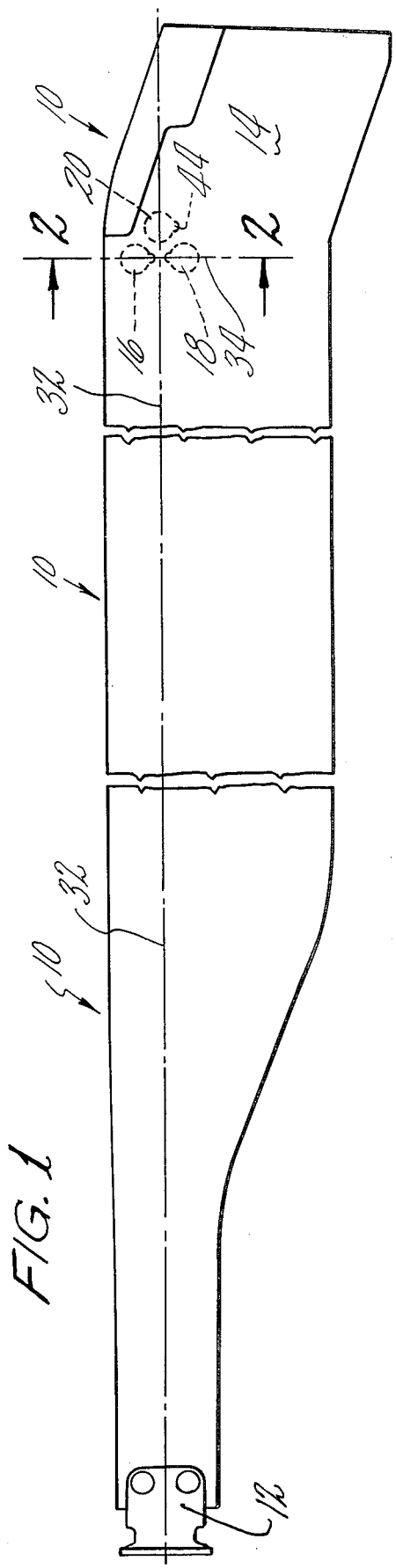
FIG. 1 is a plan view of a composite rotor blade having the tip weight attaching means of this invention, parts being broken away to facilitate illustration.
Figure 2:
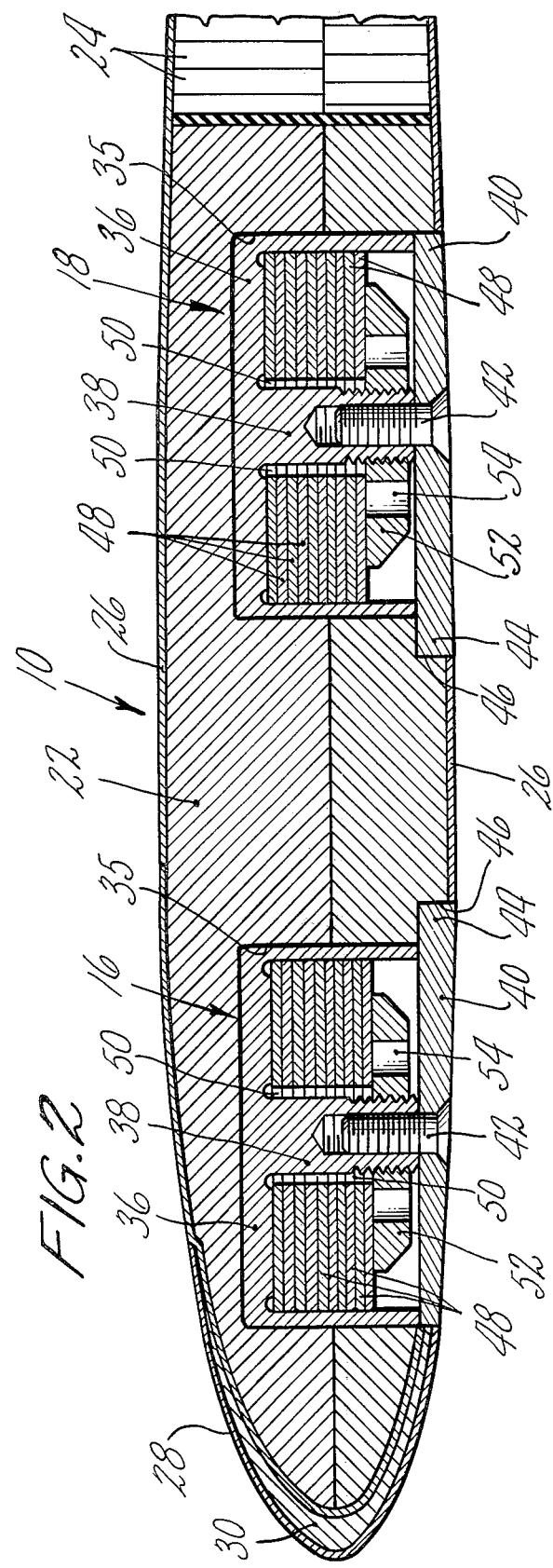
FIG. 2 is an enlarged chordwise section of the tip portion of the blade on line 2—2 of FIG. 1.

Referring to FIGS. 1 and 2, an all-composite rotor blade 10 has a root portion 12 by which it is attached to a rotor hub (not shown) and a tip portion 14 in which three weight assemblies 16, 18, and 20 are mounted for providing chordwise dynamic and static spanwise balance of the blade. As shown in FIG. 2 the leading edge portion of the blade comprises a block 22 of glass cloth and resin in which the weight assemblies 16, 18, and 20 are embedded, and a trailing edge portion 24 of light weight honeycomb material which completes the airfoil contour of the blade.

It will be noted that block 22 and honeycomb material 24 are formed in top and bottom sections which are adhesively secured together and that a skin 26 of graphite, glass fibre and resin encloses block 22 and honeycomb material 24. In making the blade, top and bottom portions of block 22 may be precured and then adhesively bonded or they may be cured in place in the blade. Skin 26 is preformed in a mold and precured and is then adhesively secured to block 22 and honeycomb 24. A nickel abrasion strip 28 and a glass fibre and resin splice cap 30, both adhesively secured, complete the leading edge of the blade. The assembled blade is then placed in an autoclave and cured under controlled conditions of heat and pressure to obtain the exact shape of the finished blade.

This invention is concerned particularly with the blade balancing assemblies 16, 18 and 20 and the means for attaching them to the blade tip. It will be evident from FIG. 1 that tip weight assembly 20 lies on the pitch axis 32 of the blade, whereas assemblies 16 and 18 lie on an adjacent chord line 34 of the blade on opposite sides of pitch axis 32 so that by varying the number of weights in these assemblies it is possible to provide both dynamic chordwise balance and static spanwise balance.

The tip weight assemblies are identical, except for their location, and reference is made to FIG. 2 in which assemblies 16 and 18 are shown in detail. The assemblies are received in deep, annular wells 35 bored in block 22 preferably from the bottom of the blade. A cup-shaped liner 36 which may be of metal having a central integral stud 38 is adhesively secured in the well with its rim terminating just beneath an aluminum alloy cover plate 40 which is removably secured in place by a screw 42 threaded into the hollow threaded end of stud 38. Plate 40 has its outer surface shaped to conform to the airfoil contour of the blade in the vicinity of well 35 and has an ear 44 which is received in a correspondingly shaped notch 46 (FIGS. 3 and 6) in skin 26 to insure that the plate is assembled and remains in the proper angular position to maintain the airfoil contour of the blade in this area. Washer-shaped shim weights 48 are positioned in liner 36 with their outside peripheries a close fit in liner 36. The inside diameter of these shims is somewhat larger than the diameter of stud 38 on which they are assembled thus providing a space 50 between the washers and the stud. Shim weights 48 are made of a tungsten alloy although two or three on the top of the stack are preferably made of some lighter metal to enable a more accurate weight adjustment to be made.

The shim weights are held in stacked relation within the well by a steel nut 52 which engages external threads on the free end of stud 38. Spanner holes 54 are provided in nut 52 for turning it onto the stud. Nut 52 is a self-locking nut and is turned down lightly against the shims, leaving them free under the action of centrifugal force to move against liner 36.

Figure 4:
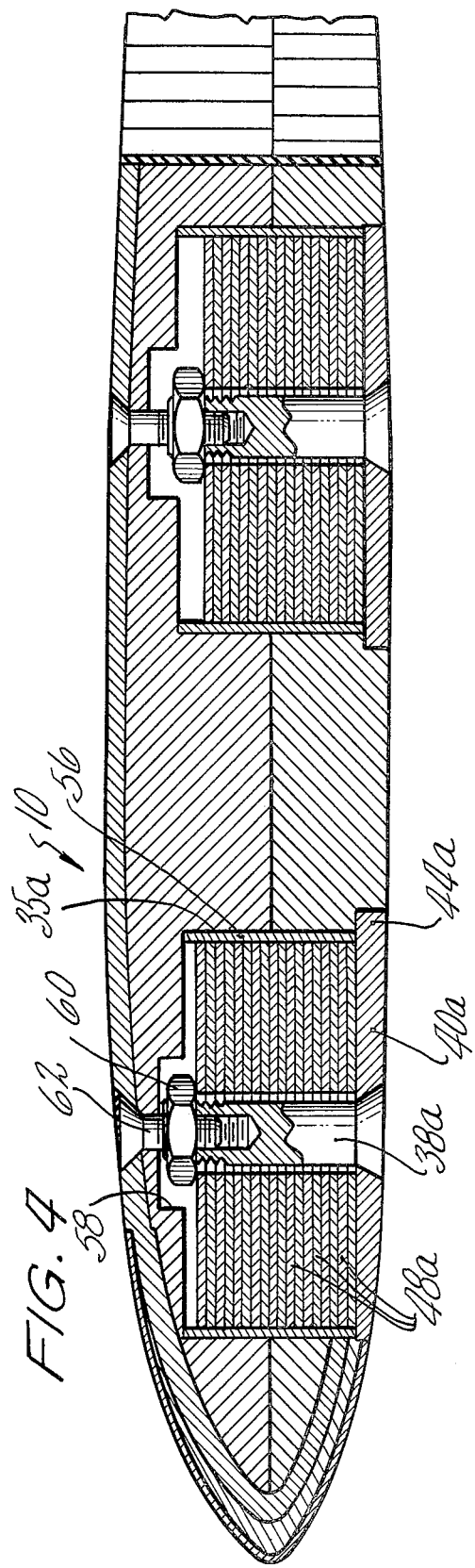
FIG. 4 is a section similar to FIG. 2 showing a modified tip weight assembly.

In FIG. 4 a slightly modified construction for the tip weight assembly is shown. Here the cover plate 40a carries the stud 38a. The liner is a cylindrical member 56 which is adhesively bonded to the sidewall of well 35a. The well has a central counter-bore 58 to accommodate a self-locking nut 60 which is threaded onto the external threaded end of stud 38a. The plate 40a has an ear 44a as in FIGS. 1 and 2. The assembly including cover plate 40a and the stacked shims 48a is held in place in the well by a screw 62 which extends through the blade from its upper surface and is threaded into the hollow threaded end of stud 38a.

Figure 5:
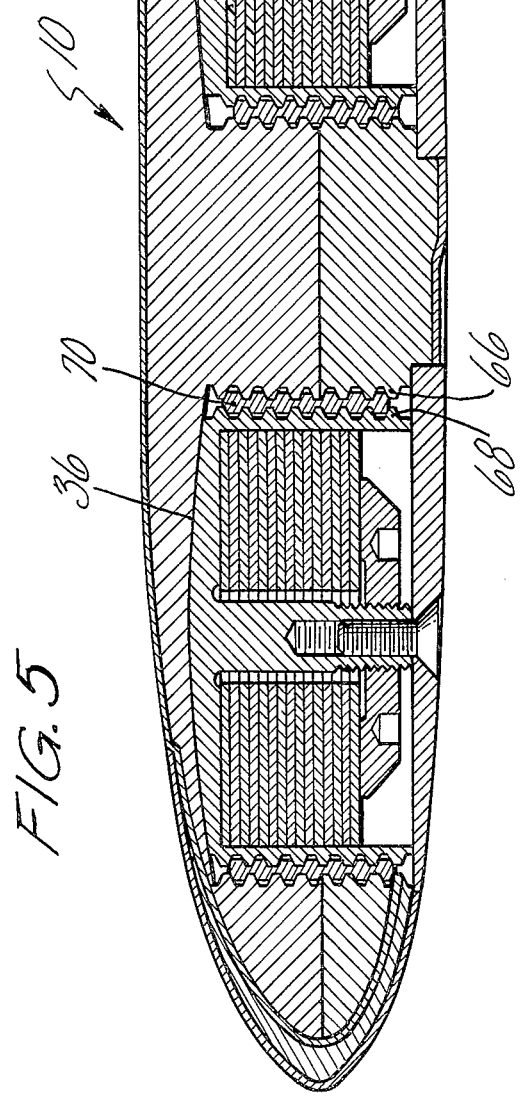
FIG. 5 is a section similar to FIG. 2 showing another modified form of tip weight assembly.

In FIGS. 5 and 6 still another construction is shown which is similar to the FIGS. 1 and 2 construction except that instead of adhesively bonding the cup-shaped liner 36 to the sidewall of the well, the adjacent sidewalls of the well and the liner are threaded at 66, 68, respectively, and a threaded insert 70 is used to connect the adjacent threaded surfaces.

In balancing a blade equipped with the tip weight assemblies of this invention, the chordwise dynamic balance of the blade is obtained by adding or removing one or more shim weights from assemblies 16 and 18 which lie on chord line 34 of the blade on opposite sides of the blade pitch axis. To get a finer adjustment one or more of the lighter weight shims may be used. To obtain static spanwise balance of the blade, shim weights 48 of assembly 20 are added or removed, as this assembly is located on the spanwise pitch axis of the blade.

The advantages of the constructions above described for attaching the shim weights to the composite material of the blade will be obvious, since it avoids screw-threaded attachment or bolted attachment of weights directly to composite materials. The shim weights are made with over-size holes through which the studs extend loosely so there is always clearance between the inside diameter of the shims and the stud. When the blade is rotated, the shims, being lightly clamped by self-locking nuts, are free to move in an outboard direction into contact with the liner under the action of centrifugal force. The forces exerted by the shims are thus distributed as compressive forces over a large surface of block 22 which is well able to withstand these compressive forces.

While I have disclosed by invention in considerable detail, I do not wish to be limited to the exact details of construction shown for obvious modifications will occur to persons skilled in this art.

I claim:

1. A composite rotor blade having a tip portion composed of a block of non-metallic material, a well in said block, a liner for the sidewall of said well, a stud centrally located in said well, a stack of shim weights conforming to said liner and having a central aperture through which said stud extends, a clamping nut threaded onto the end of said stud for holding said weights in stacked position, a cover for said well forming a portion of the skin of said blade and conforming to the airfoil contour of the blade, and a screw extending through the skin of said blade and threaded into the end of said stud.

2. A composite rotor blade of airfoil contour having a tip portion composed essentially of a block of non-metallic material, a well of substantial depth formed in said block in a major surface of said tip portion, and a tip weight assembly for balancing said blade located in said well, said assembly including a liner for the sidewall of said well, a stack of washer-shaped shim weights in said well, the outside dimension of said weights being substantially the same as the internal dimension of said liner, a hollow central stud extended through said weights, a nut which engages external threads on one end of said stud for holding said weights in stacked position, a cover plate forming a closure for said well, and a screw extending through the skin of said blade and threaded into the end of said stud.

3. Tip weight attachment means for a rotor blade having a tip portion formed essentially of a block of low density material comprising a well formed in said block in the under surface of the blade tip portion having an annular sidewall and a circular bottom wall, a cylindrical liner secured to the sidewall of said well, a stack of washer-shaped shim weights located in said well having their outside diameter substantially equal to the internal diameter of said liner, means for securing said weights in stacked position, a cover plate for the open end of said well shaped to conform to the airfoil contour of the blade in the vicinity of said well, and means to secure the cover plate over said well.

4. A composite rotor blade of airfoil cross section having a tip portion formed essentially of a block of low density non-metallic material, means for effecting dynamic chordwise balance of the blade comprising two tip weight attachment means located on opposite sides of the pitch line of the blade and means for effecting static spanwise balance of the blade including a tip weight attachment means located on said pitch line, each of said tip weight attachment means including a well formed in said block of material on the underside of the blade tip portion, a liner for the sidewall of said well secured to said block of material, a stack of annular washer-like shim weights in said well having their outside diameter substantially equal to the inside diameter of the liner, a stud having internal and external threads at its free end extended loosely through said weights and having a diameter somewhat less than the inside diameter of said weights, a nut threaded on the external threads of said stud for holding said weights in stacked position, a plate forming a closure for said well which is shaped to conform to the airfoil contour of the blade in the vicinity of said well, and a screw threaded into the internal threads of said stud for securing said cover plate in position over said well.

5. Tip weight attachment means for a rotor blade having a tip portion of light material comprising a well formed in a major surface of the blade adjacent its tip, said well having side and bottom walls, a liner for said well having integral side and bottom walls, a stud upstanding from said bottom wall of said liner having external and internal screwthreads at its free end, a stack of shim weights closely received within the sidewall of said liner having apertures for said stud which are somewhat larger than the diameter of said stud, means for securing said liner to said side and bottom walls of said well, a nut engaging said external threads on the free end of said stud for clamping said weights, a cover plate for said well shaped on its external surface to conform to the airfoil contour of the blade, and a screw extended through said cover plate and screw-threaded into said internal threads at the end of said stud.

6. The attachment means of claim 5 in which the cover plate is provided with a peripheral tab and the skin of the blade is formed with a corresponding notch to receive said tab.

7. Tip weight attachment means for a composite rotor blade including a tip portion of light material comprising three wells formed in the underside of said tip portion, one of said wells being on the pitch axis of the blade and the other two being located one fore and one aft of said pitch axis, a cup-shaped liner for each of said wells including a central stud upstanding from the bottom of each liner having external screwthreads at its free end, said stud having a hollow threaded end, a stack of washer-shaped shim weights in each liner which conform closely to the inside diameter of said liners, the inernal diameter of said weights being somewhat greater than the diameter of said studs, means for securing said liners to the bottom and sidewalls of said wells, self-locking nuts engaging said external threads on the free ends of said studs for clamping said weights lightly in stacked position, a cover plate forming a closure for each of said wells and shaped to conform to the airfoil contour of the blade in the vicinity of said wells, and means for securing each of said cover plates in position comprising a screw threaded into the hollow threaded end of each stud.

8. Tip weight attachment means for a composite rotor blade having a tip portion formed essentially of a block of light non-metallic material comprising a well of substantial depth formed in said block in the underside of said tip portion, and a tip weight assembly for balancing the blade located in said well, said assembly including a cylindrical liner adhesively secured to the sidewall of said well, a cover plate forming a closure for said well having a stud projecting into said well, a stack of shim weights in said well having a passage therethrough to receive said stud loosely, said weights having their peripheries closely adjacent said sidewall liner, a nut screw threaded on the end of said stud for clamping said weights lightly in stacked relation, and a screw extended through the top surface of said blade and screw threaded into the end of said stud for securing the assembly in said well.

9. Tip weight attachment means for a rotor blade having a tip portion of lightweight non-metallic material comprising a cylindrical well of substantial depth formed in the under surface of the blade tip portion, and a tip weight assembly for balancing the blade located in the well, said assembly including an annular cup shaped liner for said well having an upstanding central stud which is hollow at its free end, the confronting sidewalls of said liner and said well having screw threads, an internally and externally threaded insert connecting said liner to the cylindrical sidewall of said well, a stack of washer-shaped shim weights in said liner, the external diameter of said weights being substantially equal to the internal diameter of said liner and the internal diameter of said weights being somewhat greater than the diameter of said stud, a self-locking nut threaded on external threads on said stud for lightly clamping said weights, a cover for said well which is shaped to conform to the airfoil contour of the blade in the vicinity of said well, and a screw extended through said cover and threaded into the hollow end of said stud for securing said cover.

10. Tip weight attachment means for a rotor blade having a tip portion of lightweight material comprising a well of substantial depth formed in a major surface of said tip portion, a liner for said well adhesively attached to the side and bottom walls of the well, a stud upstanding from the bottom wall of said liner having external and internal threads at its free end, a stack of shim weights loosely surrounding said stud, said weights having an outside dimension closely fitting said liner, a nut engaging the external threads on said stud for lightly clamping said weights in stacked position, a cover plate having its outer surface shaped to conform to the contour of the blade in the vicinity of said well, and means for securing said cover plate in position including a screw threaded into said internal threads in said stud.

11. The tip weight attachment means of claim 10 in which the well is cylindrical, the liner is annular and cup-shaped and the shim weights are washer-shaped.

12. Tip weight attachment means for a rotor blade having a tip portion formed essentially of a block of lightweight composite material comprising a well formed in said block, a liner adhesively secured in said well having a central stud, a stack of shim weights within said liner surrounding said stud, a cover plate for said well having an outer surface shaped to conform to the airfoil contour of the blade, means for securing said shim weights in stacked position including a nut threaded on exterior threads on the free end of said stud, and a screw extended through said cover plate and threaded into the end of said stud.

13. Tip weight attachment means for a composite rotor blade having a tip portion composed of a block of low density material non-metallic material comprising a tip weight assembly embedded in the material of said block, said assembly including a cup-shaped metallic member having its open end accessible from a major surface of said blade, said member having a centrally located stud therein, a stack of washer-shaped shim weights in said member, a nut threaded on said stud for retaining a selected number of shim weights in stacked position in said member, a cover plate forming a closure for the open end of said member which conforms to the airfoil contour of said blade, and means having a threaded connection with said stud for attaching said plate to said blade.

14. Tip weight attachment means for a composite rotor blade having a tip portion composed of a block of low density material comprising a cup-shaped member embedded in the material of said block with its lip substantially flush with a major surface of said blade, a stack of shim weights in said member having their peripheries closely fitting the inside of said member, means for releasably holding said weights in stacked position in said member, a removable cover for the open end of said member which conforms on its exterior surface to the airfoil contour of the blade and when removed provides access to said weights, and means for securing said cover to said member.

15. The tip weight attachment means of claim 14 in which the means for holding the weights in stacked position is a stud carried by said member which extends through the stacked weights and a nut screw-threaded onto the end of said stud, and the means for securing the cover is a screw extended through the cover and threaded into the end of said stud.

* * * * *